United States Patent
Nagaoka et al.

(10) Patent No.: US 8,273,672 B2
(45) Date of Patent: *Sep. 25, 2012

(54) OPTICAL GLASS

(75) Inventors: Atsushi Nagaoka, Sagamihara (JP); Jie Fu, Sagamihara (JP); Michiko Ogino, Sagamihara (JP)

(73) Assignee: Ohara Inc., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/604,030

(22) Filed: Oct. 22, 2009

(65) Prior Publication Data

US 2010/0041539 A1 Feb. 18, 2010

Related U.S. Application Data

(63) Continuation of application No. 11/514,109, filed on Sep. 1, 2006.

(30) Foreign Application Priority Data

Sep. 6, 2005 (JP) ................................. 2005-258533
May 9, 2006 (JP) ................................. 2006-129925

(51) Int. Cl.
*C03C 3/064* (2006.01)
*C03C 3/068* (2006.01)
*C03C 3/066* (2006.01)
*C03C 3/14* (2006.01)
*C03C 3/15* (2006.01)

(52) U.S. Cl. ................ 501/77; 501/49; 501/50; 501/78; 501/79

(58) Field of Classification Search ............... 501/49, 501/77, 78, 79, 50
See application file for complete search history.

(56) References Cited

U.S. PATENT DOCUMENTS

| | | | |
|---|---|---|---|
| 5,378,408 A | 1/1995 | Carroll et al. | |
| 6,620,748 B1 | 9/2003 | Sugimoto et al. | |
| 7,670,973 B2 * | 3/2010 | Ritter et al. | 501/42 |
| 7,737,064 B2 * | 6/2010 | Fu | 501/73 |
| 2003/0191006 A1 * | 10/2003 | Natsugari et al. | 501/49 |
| 2004/0145815 A1 | 7/2004 | Endo | |
| 2004/0220040 A1 | 11/2004 | Uehara | |
| 2004/0254057 A1 | 12/2004 | Schreder et al. | |
| 2005/0037913 A1 * | 2/2005 | Peuchert et al. | 501/78 |
| 2006/0063660 A1 | 3/2006 | Schreder et al. | |

FOREIGN PATENT DOCUMENTS

| | | |
|---|---|---|
| DE | 10211246 A1 | 9/2003 |
| EP | 1291329 A1 | 3/2003 |
| JP | 07097234 | 4/1995 |
| JP | 09020530 | 1/1997 |
| JP | 2001/139345 A * | 5/2001 |
| JP | 2001139345 A | 5/2001 |
| JP | 2002173336 A | 6/2002 |
| JP | 2002201039 A | 7/2002 |
| JP | 200334550 A | 2/2003 |
| JP | 2004292299 A | 10/2004 |
| SU | 947102 A1 | 7/1982 |
| WO | 2004074197 A1 | 9/2004 |
| WO | 2006118326 A1 | 11/2006 |

OTHER PUBLICATIONS

Notice of Reasons for Rejection issued to KR Application No. 10-2006-0084593 Mailed Mar. 1, 2010.
O. Deparis, et al., "Origin and Enhancement of the Second-Order Non-Linear Optical Susceptibility Induced in Bismuth Borate Glasses by Thermal Poling," Journal of Non-Crystalline Solids, vol. 351, No. 27-29, Aug. 15, 2005, pp. 2166-2177.

* cited by examiner

*Primary Examiner* — Jerry A Lorengo
*Assistant Examiner* — Noah S Wiese
(74) *Attorney, Agent, or Firm* — Hoffmann & Baron, LLP

(57) ABSTRACT

An optical glass is provided that includes a refractive index ($n_d$) of no less than 1.75 and an Abbe number ($v_d$) of no less than 10 as optical constants. A $Bi_2O_3$ content is no less than 10% by weight to no more than 80% by weight. The content of $SiO_2$ is lower than the content of $B_2O_3$. The total content of $SiO_2+B_2O_3$ is from no less than 1% by weight to no more than 60% by weight. The content of RO is from no less than 0.1% by weight to no more than 50% by weight. R represents one or more elements selected from the group consisting of Zn, Ba, Sr, Ca, and Mg. The optical glass has at least one of the properties of being substantially free from opacification and/or being substantially devitrified within the glass body under the conditions of a reheating testing.

18 Claims, No Drawings

OPTICAL GLASS

CROSS REFERENCE TO RELATED APPLICATIONS

This is a continuation application of U.S. patent application Ser. No. 11/514,109, filed on Sep. 1, 2006, which claims priority of Japanese Patent Application No. 2005-258533, filed on Sep. 6, 2005, and Japanese Patent Application No. 2006-129925, filed on May 9, 2006. The subject matter of this earlier filed applications is hereby incorporated by reference.

BACKGROUND

1. Field

The present invention relates to optical glasses containing bismuth oxide, more particularly to optical glasses having at least one of the properties of being free from opacification and being devitrified in a glass body under such conditions as press-molding, including precision presses and reheat presses as well as reheat tests thereof.

2. Description of the Related Art

In recent years, equipment or instruments, equipped with optical systems, have been highly integrated and sophisticated, leading to more and more demands for the optical systems in terms of high accuracy, lightweight and miniaturization, thus the optical systems have been mainly designed using aspheric lenses formed of high index/high dispersion glasses in order to reduce the number of lenses.

It is expensive and non-efficient in particular to produce aspheric lenses by way of grinding or polishing processes; therefore, the aspheric lenses are presently produced by lower cost mass-production processes without the grinding or polishing processes such that gobs or glass blocks are cut and grinded to form a preform material, the preform material is heated and softened then is pressure-molded by use of a mold having a highly precise surface.

In order to attain the object to mass-produce the aspheric lenses with lower cost, it is necessary to investigate various conditions so as to satisfy items (i) to (iii) below:

(i) the glass is free from devitrification i.e. maintains transparency under reheating conditions, for example, of reheating-pressing processes for softening gobs or glass blocks by heating thereof;

(ii) the glass has superior chemical durability such that particular control is unnecessary in handling thereof after the polishing step; and (iii) the temperature at mold-pressing step is as low as possible, so that molds for the mold-pressing can be far from surface oxidation and thus be repeatedly usable (there exists a relation between upper temperatures at mold-pressing and transition temperatures; the progress of the surface oxidation may be slower as these temperatures being lower).

With respect to (i) described above, the glasses based on $TiO_2$ or $Nb_2O_5$ containing $SiO_2$ or $B_2O_3$ as a former tend to exhibit relatively higher transition temperatures or higher glass yield points. Accordingly, these glasses are inappropriate for mass production, since crystals are likely to deposit at reheating steps at producing aspheric lenses, which causing problems such as lowering of process yield.

On the other hand, Japanese Unexamined Patent Publication No. 07-97234 and Japanese Unexamined Patent Publication No. 2002-173336 disclose glasses based on $P_2O_5$ utilized as precision-press materials. These materials may be softened and press-molded at temperatures lower than those of conventional $SiO_2$ glasses. However, these glasses still exhibit higher glass transition temperatures, so that the glasses react with surfaces of mold materials, consequently optical parts come to difficult to reproduce the surface accuracy at the transferred surfaces through the precision-molding processes, and also the surfaces of mold materials tend to be injured. Furthermore, these glasses are likely to cause the devitrification due to basic components of $P_2O_5$, $TiO_2$, $Nb_2O_5$ or $WO_3$ through the reheating step, and also are relatively difficult to undergo precision press-molding due to problems such as possible fusion with molds or their clacks.

In addition, Japanese Unexamined Patent Publication No. 09-20530 discloses a glass containing $Bi_2O_3$ as a basic component; however, the refractive index and the dispersion are insufficient and also the glass transition point is higher. Furthermore, there exist such problems as the glass tends to display considerable opacification or to color into black at the reheating step in producing processes of the aspheric lenses or at reheating tests corresponding to reheat presses.

The present invention has been made in light of the objects described above; that is, the present invention provides optical glasses containing bismuth oxide in which the optical glasses are having at least one of the properties of being free from opacification and being devitrified within glass body at the reheating step in producing processes of the aspheric lenses or at the reheating tests corresponding to the reheat presses, and also optical glasses with superior chemical durability and free from coloring into black.

SUMMARY

According to an embodiment of the invention, there is provided an optical glass. The optical glass includes a refractive index ($n_d$) of no less than 1.75 and an Abbe number ($v_d$) of no less than 10 as optical constants. The optical glass further includes a $Bi_2O_3$ content of no less than 10% by weight to no more than 80% by weight, a content of $SiO_2$ lower than the content of $B_2O_3$, a total content of $SiO_2+B_2O_3$ being from no less than 1% by weight to no more than 60% by weight, a content of RO being from no less than 0.1% by weight to no more than 50% by weight, whereby R represents one or more elements selected from the group consisting of Zn, Ba, Sr, Ca, and Mg. The optical glass has at least one of the properties of being substantially free from opacification and/or being substantially devitrified within the glass body under the conditions of a reheating test. The reheating test includes a test piece of 15 mm by 15 mm by 30 mm being reheated, such that the test piece is heated from room temperature to a temperature of 80 degrees C. higher than its transition temperature (Tg) for a period of 150 minutes, maintained for 30 minutes at the temperature of 80 degrees C. higher than the glass transition temperature (Tg) of the optical glass, allowed to cool to an ambient temperature, and finally observed visually after polishing the opposing two sides of the test piece to a thickness of 10 mm.

DETAILED DESCRIPTION OF THE PREFERRED EMBODIMENTS

The optical glass according the present invention will be explained with respect to specific embodiments below.

Glass Component

The composition range of respective components that constitute the inventive optical glasses will be explained in the following. The respective components are expressed in terms of % by weight. The glass compositions expressed in this specification are entirely on the basis of oxide. The term "on the basis of oxide" means that the contents of the respective components are expressed assuming that the raw materials of the inventive glasses such as oxides and nitrates are entirely turned into oxides through decomposition and the like at the melting step and the total content of resulting oxides is 100% by weight.

Essential and Optional Components $Bi_2O_3$ is an essential component in order to attain the object of the present invention since it is effective to stabilize glasses, to achieve high index/high dispersion and to lower glass transition temperatures (Tg). Excessively higher amount of $Bi_2O_3$, however, tends to degrade glass stability, and excessively lower amount of $Bi_2O_3$ makes difficult to attain the inventive object. Accordingly, the content of $Bi_2O_3$ is preferably no less than 10%, more preferably no less than 20% and most preferably no less than 30%, preferably less than 90%, more preferably no more than 85% and most preferably no more than 80%.

$B_2O_3$ or $SiO_2$ is an essential component as a glass-forming oxide, and significantly effective for the devitrification and to raise the viscosity at the liquid-phase temperature. The lower-limit content of one of these components or sum of these components is preferably 1%, more preferably 3%, and still more preferably 7%. On the other hand, the upper-limit content thereof is preferably 60%, more preferably 50% and still more preferably 40% in order to achieve desirable refractive indexes.

These two components may exhibit an effect to improve devitrification resistance even when one of these is introduced alone in the glasses, thereby the object of the present invention may be attained. When the ratio $SiO_2/B_2O_3$ is controlled to less than 1.0 (the content of $SiO_2$ being less than that of $B_2O_3$), the devitrification resistance may be further improved within glass body.

When a glass yield point (At) according to the inventive object is to be attained effectively, the upper-limit content of $B_2O_3$ is preferably defined as 30%, more preferably 25% and most preferably 20%. In addition, the upper-limit content of $SiO_2$ is preferably defined as 20%, more preferably 15% and most preferably 10%.

$Al_2O_3$ is an effective component to improve chemical durability; however, excessively higher content thereof tends to deteriorate glass solubility, to increase devitrification, and to raise the glass yield point. Accordingly, the upper-limit content is preferably defined as 20%, more preferably 15% and most preferably 10%.

$TiO_2$ is an effective optional component in the glasses to raise the refractive index, to contribute to the high dispersion, and to lower the liquid-phase temperature; however, excessively higher content thereof tends to disadvantageously prompt the devitrification. Accordingly, the content is preferably defined as no more than 20%, more preferably no more than 10% and most preferably no more than 5%.

$Nb_2O_5$ is an effective optional component in the glasses to raise the refractive index, to contribute to the high dispersion and to improve devitrification; however, excessively higher content thereof tends to deteriorate the glass solubility. Accordingly, the content is preferably defined as no more than 20%, more preferably no more than 15% and most preferably no more than 8%.

$WO_3$ is an effective optional component in the glasses to raise the refractive index, to contribute to the high dispersion and to lower the yield point; however, excessively higher content thereof tends to increase phase-separation in glasses. Accordingly, the content is preferably defined as no more than 15%, more preferably no more than 10%, and most preferably no more than 5%.

$Ta_2O_5$ is an effective optional component in the glasses to raise the refractive index and to improve to the chemical durability; however, excessively higher content thereof tends to increase phase-separation in the glasses. Accordingly, the upper-limit content is preferably defined as 15%, more preferably 10% and most preferably 5%. Still more preferably, there exists no $Ta_2O_5$.

$ZrO_2$ is an optional component effective to improve to the chemical durability; however, excessively higher content thereof tends to promote inclination to the devitrification of the glasses. Preferably, the upper-limit content is defined as 10%, more preferably 5% and most preferably 2%. Still more preferably, there exists no $ZrO_2$.

As described above, $Al_2O_3$ and $ZrO_2$ are effective components for improving the chemical durability; $Bi_2O_3$ provides an effect to enhance the water resistance. $SiO_2$ is an essential component as a glass-forming oxide which is significantly effective for the devitrification and for raising the viscosity at the liquid-phase temperature. Accordingly, it is preferred that these components are controlled in a certain range so as to satisfy the devitrification and the chemical durability of the glasses. In addition, the present inventors have found that there is an intimate relation between the transmissivity degradation and the water resistance in precision press-molding products, that is, the enhancement of water resistance or establishment of firm glass construction may significantly contribute to mitigate the transmissivity degradation at precision pressing steps. As such, when the total content of these components is excessively lower, the glass is likely to cause the coloring at heating under non-oxidative atmosphere and also to degrade the devitrification resistance. Accordingly, the lower limit of the total content of $Bi_2O_3$, $SiO_2$, $Al_2O_3$ and $ZrO_2$ is preferably 65%, more preferably 70% and most preferably 75%.

In addition, the RO component described later is an optional component that may provide mainly an effect to stabilize the glasses; when an optical constant is to be controlled, it may be considered as a reference for the entire composition. That is, when the refractive index to be raised by use of a component such as $Bi_2O_3$ or to be lowered by use of other components, a portion of the RO component is often substituted by a component. As such, the chemical durability and the glass stability may be properly satisfied by way of setting the total content of $SiO_2$, $Al_2O_3$ and $ZrO_2$ while considering the RO as a reference. Accordingly, the ratio of the total content of $SiO_2$, $Al_2O_3$ and $ZrO_2$ to the RO component is preferably no less than 0.5, more preferably no less than 0.6, and most preferably no less than 0.7.

The RO component, in which R represents one or more elements selected from the group consisting of Zn, Ba, Ca, Mg and Sr, may increase the melting property and the devitrification resistance and to enhance the chemical durability, thus the glasses preferably contain any of these components. Preferably, the glasses contain the RO, in which R represents one or more elements selected from the group consisting of Zn, Ba, Ca, Mg and Sr in a total content of no less than 0.1%, more preferably no less than 5% still more preferably no less than 10%.

ZnO is an effective component to improve to the chemical durability; however, excessively higher content thereof tends to allow the devitrification of the glasses. Accordingly, it is preferred that the upper-limit content is defined as 20%, more preferably 15% and most preferably 10%.

CaO is an effective component to improve to the melting property of the glasses; however, excessively higher content thereof tends to allow the devitrification. Accordingly, it is preferred that the upper-limit content is defined as 20%, more preferably 15% and most preferably 10%.

BaO is an effective component to improve the devitrification and the coloring of the glasses; however, excessively higher content thereof may disturb the refractive index intended by the present development. Accordingly, it is preferred that the upper-limit content is defined as 50%, more preferably 40% and most preferably 35%. The lower-limit content is preferably defined as 0.1%, more preferably 1% and most preferably 3%.

MgO is an effective component to attain the high dispersion of the glasses; however, excessively higher content thereof may promote the occurrence of the devitrification at the reheating test. Accordingly, it is preferred that the upper-limit content is defined as less than 10%, more preferably less than 7% and most preferably less than 4%.

SrO is an effective component to improve the devitrification property of the glasses; however, excessively higher content thereof may make difficult to attain the intended optical constant. Accordingly, it is preferred that the upper-limit content is defined as 50%, more preferably 40% and most preferably 35%.

The $Rn_2O$ component, in which Rn represents one or more elements selected from the group consisting of K, Na, Li and Cs is an effective optional component in the glasses to lower the melting property and the glass yield point; however, excessively higher content thereof may promote the transmissivity degradation at heating under non-oxidative atmosphere. Accordingly, it is preferred that the upper-limit content is defined as 10%, more preferably 5% and most preferably 1.5%.

$Li_2O$ is an effective component in the glasses to improve the melting property and to prevent the occurrence of devitrification at the reheating test; however, excessively higher content thereof may make difficult to take the refractive index intended in the present invention. Accordingly, it is preferred that the upper-limit content is defined as 15%, more preferably 10% and most preferably 5%.

$Na_2O$ is an effective component in the glasses to improve the devitrification property and to prevent the occurrence of devitrification at the reheating test; however, excessively higher content thereof may lower the refractive index. Accordingly, it is preferred that the upper-limit content is defined as 15%, more preferably 10% and most preferably 5%.

$K_2O$ is an effective component in the glasses to improve the devitrification property; however, excessively higher content thereof may make difficult to take the refractive index intended in the present invention. Accordingly, it is preferred that the upper-limit content is defined as 20%, more preferably 15% and most preferably 10%.

Furthermore, in order to improve the devitrification property intended in the present invention, it is preferred that the lower-limit content of $RO+Rn_2O$ is defined as 0.1%, more preferably 5% and most preferably 10%. The upper-limit is preferably defined as 60%, more preferably 55% and most preferably 50%.

$TiO_2$, $Nb_2O_5$ and $WO_3$ are significantly important components to control the optical constant as described above, and these contents are preferably adjusted to certain levels while keeping a relation with RO and/or $Rn_2O$ components. When the total content is excessively higher, the devitrification tends to develop significantly, thus the glass stability may be degraded remarkably. Accordingly, the upper-limit of $TiO_2$, $Nb_2O_5$, $WO_3$, RO and $Rn_2O$ is preferably 60% in terms of their total content, preferably 55% and most preferably 50%. The lower-limit is preferably no less than 0.1%, and 0% is allowable.

When the content of $TiO_2$, $Nb_2O_5$ and $WO_3$ is excessively high as for the total content with $Ln_2O_3$, the glass stability may be degraded remarkably. Accordingly, the upper-limit of $TiO_2$, $Nb_2O_5$, $WO_3$ and $Ln_2O_3$ is preferably 60% in terms of their total content, preferably 40% and most preferably 10%.

The components of $Y_2O_3$, $La_2O_3$, $Gd_2O_3$ and $Yb_2O_3$ are effective in the glasses to enhance the chemical durability, and these components may be added optionally. When the content is excessively higher, the dispersion tents to be deteriorated and the devitrification resistance tends to increase. Accordingly, the upper-limit of these components is preferably defined as 10% in terms of their total content, more preferably 7% and most preferably 0.1%. Still more preferably, there exists no these components.

In addition, it is preferred that the total content of $Ln_2O_3$, in which Ln represents one or more elements selected from the group consisting of La, Gd, Y, Ce, Eu, Dy, Yb and Lu is controlled within a range considering the relation with the content of RO and/or $Rn_2O$ components. The upper limit of $Ln_2O_3$, RO and $Rn_2O$ is preferably 50% in terms of their total content, more preferably 48% and most preferably 45%. The lower-limit is preferably 0.5%, more preferably 1% and most preferably 1.5%.

$P_2O_5$ is a component effective to improve the coloring in the glasses, and the component may be added optionally. Excessively higher content thereof tends to promote phase-separation of the glasses. Accordingly, the upper-limit of the component is preferably defined as 10%, more preferably 5%, and most preferably 1%. Still more preferably, there exists no this component.

$Sb_2O_3$ may be optionally added for defoaming the melted glasses, and provides the effect sufficiently in a content of no more than 3%.

$GeO_2$ is an effective component in the glasses to improve the coloring and to enhance the high index/high dispersion, and is added in some cases considering its relatively higher cost. Accordingly, the upper-limit of the component is preferably defined as 20%, more preferably 10% and most preferably 5%. Still more preferably, there exists no this component.

F may affect to enhance the melting property of the glasses, and may optionally be added since it drops the refractive index drastically. Accordingly, the upper-limit of the component is preferably defined as 5%, more preferably 3% and most preferably 1%. Still more preferably, there exists no this component.

Components Non-Desirable to Include

The other components may be added as required provided that the properties of the inventive glasses are not deteriorated. In this regard, components of various transition metals such as V, Cr, Mn, Fe, Co, Ni, Cu, Ag and Mo, except for Ti, induce coloring of the glasses even when included at a small amount individually or in combination thereof, thereby causing radiation absorption at a certain visible wavelength. Accordingly, it is desirable for optical glasses employed at visible wavelengths to contain substantially no these components.

Th component may be included for the purpose of raising the refractive index and stabilizing the glasses, and Cd and Tl components may be included for the purpose of lowering the glass transition temperature (Tg). However, in these years the components of Pb, Th, Cd, Tl and Os are likely to be avoided from their usage in light of harmful chemical substances, and environmental measures are required not only at the production steps of the glasses but also at processing steps and disposal of the produced articles. Accordingly, it is preferred that these components are substantially excluded when the environmental effects are important.

The component of lead requires the environmental measures at producing, processing and disposing of the glasses, resulting in higher cost, thus the lead is to be nothing within the inventive glasses.

$As_2O_3$ is a component to improve the defoaming property at melting the glasses; however, it requires the environmental measures at producing, processing and disposing of the glasses, thus it is undesirable to include $As_2O_3$ in the inventive glasses.

In accordance with the present invention, it is preferred that at least one of the following components is included, as indicated:

$Bi_2O_3$: 10 to less than 90%,
$SiO_2$: more than 0% to less than 20%,
BaO: 0 to 50%,
$B_2O_3$: 0 to 30%,
$Al_2O_3$: 0 to 20%,
$TiO_2$: 0 to 20%,
$Nb_2O_5$: 0 to 20%,
$WO_3$: 0 to 15%,
$Ta_2O_5$: 0 to 15%,
$ZrO_2$: 0 to 10%,
ZnO: 0 to 20%,
MgO: 0 to less than 10%,
CaO: 0 to 20%,
SrO: 0 to 50%,
$Li_2O$: 0 to 15%,
$Na_2O$: 0 to 15%,
$K_2O$: 0 to 20%,
$Y_{203}$: 0 to 10%,
$La_2O_3$: 0 to 10%,
$Gd_2O_3$: 0 to 10%,
$Yb_2O_3$: 0 to 10%,
$P_2O_5$: 0 to 10%,
$Sb_2O_3$: 0 to 3%,
$GeO_2$: 0 to 20%, and
F: 0 to 5%.

The optical glasses according to the present invention are of high index/high dispersion, and may easily display a glass transition temperature (Tg) of no more than 550 degrees C. Preferable range of the Tg is no more than 530 degrees C., more preferably is no more than 510 degrees C.

Production Method

The optical glasses according to the present invention may be produced by conventional methods of producing optical glasses without limitation, for example, may be produced by the method described below. Each of the raw materials such as oxides, carbonates, nitrates, phosphates, sulfates and fluoride salts is weighed to a predetermined amount and combined uniformly. The combined raw material is poured into a quartz or alumina crucible and is preliminarily melted, then poured into a gold, platinum, platinum alloy, or iridium crucible and melted within a melting furnace at 850 to 1250 degrees C. for 1 to 10 hours. Then the material is mixed and homogenized, followed by cooling to an appropriate temperature and casting within a mold etc. thereby to produce the glass.

Reheating Test

The glasses free from devitrification within the glass body or those having a transmissivity loss of no more than 5% in the reheating test (a) or (b) may expand freedom in optical design. Furthermore, the chromatic aberration, which conventionally having been reduced by use of complicated processing of lens shape represented by aspheric processing or by way of increasing the number of lenses, may be effectively reduced without such complicated processing of lens shape or increasing the number of lenses, and also the reheating treatment represented by reheating press processing may be carried out easily, thereby the production cost of the optical elements may be saved.

The reheating test (a) is carried out as following: a test piece of a prismatic shape glass sample of 15 mm by 15 mm by 30 mm is set on a refractory body and disposed in an electric furnace, then is reheated. The heating cycle is such that the sample is heated from the ambient temperature to the temperature 80 degrees C. higher than the grass transition temperature (Tg) of the sample through 150 minutes, then the sample is maintained at the temperature for 30 minutes; thereafter the sample is allowed to cool to the ambient temperature, and removed outside the furnace. After polishing the opposing two sides of the test piece into 10 mm thick, the glass sample is observed visually.

The expression "free from devitrification within the glass body" in this test means that the processes of heating and softening the cut and/or polished gobs or glass blocks then press-molding by use of a mold having a highly precise surface and/or the process of reheat-press processing may be easily carried out, which is an important property for the present invention. In the case of reheat-press processing, the higher is the temperature set at the reheating test, the lower is the glass viscosity, thus the pressing pressure may be reduced. However, the durability tends to be deteriorated remarkably for the press-molded products, therefore, the evaluation is preferably carried out under the condition that the preset temperature is controlled at 50 to 200 degrees C. higher than the glass transition temperature and the duration of keeping at the temperature is 5 minutes to 1 hour. More preferably, the evaluation is carried out under the condition that the preset temperature is controlled at 70 to 180 degrees C. higher than the glass transition temperature and the duration of keeping at the temperature is 10 to 40 minutes.

In addition, such a property is necessary for achieving production of optical elements with lower cost and proper productivity, such that at least one of the characteristics of there being substantially no opacification and being devitrified exists in the glass body even after certain conditions of reheating test (a) in particular after maintaining at 100 degrees C. higher than the glass transition temperature (Tg) for 30 minutes. More preferable is that at least one of the characteristics of there being substantially no opacification and/or being devitrified exists in the glass body even after maintaining at 150 degrees C. higher than the glass transition temperature (Tg) for 30 minutes.

In addition, it is preferred that value, calculated by dividing the transmissivity of the test piece after the reheating test (a) by the transmissivity of the test piece before the reheating test (a) using a radiation (D ray) of wavelength 587.56 nm, is no less than 0.95, more preferably no less than 0.96 and most preferably no less than 0.97. Furthermore, it is preferred that the difference of the wavelength $\lambda_{70}$ of the test piece before the reheating test (a) and the wavelength $\lambda_{70}$ after the reheating test (a) is no more than 20 nm, more preferably no more than 18 nm and most preferably no more than 16 nm.

The reheating test (b) is carried out in a way that a two side-polished test piece of 10 mm thick is heated from room temperature to the yield point at a rising rate of 6.5 degrees C. per second under non-oxidizing atmosphere, then is maintained at the yield point for 300 seconds, and the temperature is lowered to 220 degrees C. at a rate of 2.4 degrees C. per second, thereafter the transmissivity of the test piece of 10 mm thick is measured in the thickness direction to determine the transmissivities of before and after the test.

In the present invention, "transmissivity loss" is employed as an index for transmissivity degradation under the reheating test (b). The "transmissivity loss" corresponds to the value expressed by percentage of the difference of transmissivities measured at an identical wavelength within visible irradiation of 360 to 800 nm at which the transmissivities display the highest difference between before and after the reheating test (b). That is to say, transmissivity curves are prepared at visible wavelengths and compared for the samples before and after the reheating test (b), then the highest difference (%) of transmissivities at certain wavelength λ nm is defined as the "transmissivity loss". In the present invention, the transmissivity loss is preferably no more than 5%, more preferably no more than 4% and most preferably no more than 3%.

In the present invention, "chemical durability", in particular water resistance is considered to represent an intimate relation with the transmissivity degradation in the reheating test. The glasses according to the present invention represent weight loss, measured by "In terms of a Chemical Durability of Optical Glass" JOGIS06-1996 specified by Japanese Optical Glass Industrial Standards, of preferably no more than 0.2% by weight, more preferably no more than 0.19% by weight and most preferably no more than 0.18% by weight.

The optical glasses of the present invention may be typically utilized for lenses, prisms and mirrors. In addition, the method of producing optical elements according to the present invention typically produces a spherical preform by flowing dropwise a melted glass from an outlet of outflow pipe formed of platinum and the like. The preform is subjected to a precision press-molding process to produce an optical element having an intended shape.

EXAMPLES

The present invention will be explained in more detail with reference to Examples and Comparative Examples, but the present invention will not be limited the Examples.

Each of a total amount of 400 g was weighed according to the compositions shown in Tables 1 to 6 as raw materials and was mixed uniformly. Each of the raw materials was melted at 950 to 1050 degrees C. for 2 to 3 hours using a quartz or platinum crucible, then the temperature was lowered to 800 to 900 degrees C. and the material was maintained additionally at the temperature for about 1 hour followed by casting into a mold to produce the respective glasses. The glass properties of the resulting glasses are shown in Tables 1 to 6. The glasses of Comparative Examples 1 and 2 having composition shown in Table 7 were also produced using the same processes with those of Examples.

The optical glasses of Examples were determined for refractive index ($n_d$), Abbe number ($v_d$) and glass transition temperature (Tg), and the glasses were subjected to the reheating test.

The refractive index ($n_d$) and Abbe number ($v_d$) were determined for the resulting glasses with controlling the slow-cooling temperature-dropping rate at minus 25 degrees C./hr.

The glass transition temperature (Tg) was determined using a thermodilatometer with controlling the temperature-rising rate at 8 degrees C./min.

In the reheating test (a), a test piece of 15 mm by 15 mm by 30 mm was disposed on a concave refractory and inserted into an electric heater then was reheated in a way that the temperature was raised from room temperature to a temperature of 80 degrees C. higher than the transition temperature (Tg) of each sample, i.e. the temperature at which each sample sinking into the refractory, through a period of 150 minutes. The sample was maintained at the temperature for 30 minutes then was cooled to the ambient temperature and was removed from the furnace. The opposing two sides of each sample were polished to 10 mm thick so as to observe the inside body, and the polished sample was observed visually.

The transmissivity was measured in accordance with JOGIS02-2003 specified by Japanese Optical Glass Industrial Standards. In the present invention, the transmissivity was represented rather than color degree. Specifically, an article of which the opposing sides being polished in parallel to 10±0.1 mm thick was determined for the spectral transmission factor of D ray. (D ray transmissivity after reheating test (a))/(D ray transmissivity before reheating test (a)) was obtained, and the change of the maximum transmissivity was evaluated between before and after the reheating test (a).

At the same time, the identical sample was measured as to the difference between the $\lambda_{70}$ of the test piece before the reheating test (a) and the $\lambda_{70}$ of the test piece after the reheating test (a), and the difference was considered as an index of the transmissivity degradation. The $\lambda_{70}$ refers to the wavelength at which the transmissivity comes to 70% when the transmissivity being measured at various wavelengths in accordance with JOGIS02-2003. That is to say, the less is the difference between the $\lambda_{70}$ of the test piece before the reheating test (a) and the $\lambda_{70}$ of the test piece after the reheating test (a), the less is the transmissivity degradation at the reheating test (a).

The condition of the crystal deposition was measured in accordance with JOGIS13-1994 "Method of Determining Foreign Substance within Optical Glass" specified by Japanese Optical Glass Industrial Standards. Specifically, the test piece after the reheating test was evaluated with respect to the particle size and the number of foreign substances by use of a microscope capable of detecting and measuring at least 2 micrometers or other equipment equivalent therewith. The total cross section and total number were counted as to glasses of each 100 ml and they were rated. The 1st grade indicates the total cross section being less than 0.03 $mm^2$, the 2nd grade indicates the total cross section being from no less than 0.03 $mm^2$ to less than 0.1 $mm^2$, the 3rd grade indicates the total cross section being from no less than 0.1 $mm^2$ to less than 0.25 $mm^2$, the 4th grade indicates the total cross section being from no less than 0.25 $mm^2$ to less than 0.5 $mm^2$ and the 5th grade indicates the total cross section being no less than 0.5 mm in a glass of 100 ml respectively. The A grade indicates the total number being less than 10, the B grade indicates the total number being from no less than 10 to less than 100, the C grade indicates the total number being from no less than 100 to less than 500, the D grade indicates the total number being from no less than 500 to less than 1000 and the E grade indicates the total number being no less than 1000.

The reheating test (b) was carried out in a way that a two side-polished test piece of 10 mm thick was heated from room temperature to the yield point at a rising rate of 6.5 degrees C. per second under non-oxidizing atmosphere, then was maintained at the yield point for 300 seconds, and the temperature was lowered to 220 degrees C. at a rate of 2.4 degrees C. per second, thereafter the transmissivity of the test piece was measured in the thickness direction to determine the transmissivities of before and after the test. The transmissivity degradation means that the test piece after the test shows a lower transmissivity compared to that before the test through undergoing the reheating test (b).

In the present invention, "transmissivity loss" is employed as an index for degradation of transmissivity under the reheating test (b). The "transmissivity loss" corresponds to the value expressed by percentage of the difference of transmissivities measured at an identical wavelength within visible irradiation of 360 to 800 nm at which the transmissivities display the highest difference between before and after the reheating test (b). That is to say, transmissivity curves are prepared at visible wavelengths and compared for the samples before and after the reheating test (b), then the highest difference (%) of transmissivities at certain wavelength X nm is defined as the "transmissivity loss".

The chemical durability or water resistance was determined in accordance with "Method of Determining Chemical Durability of Optical Glass" JOGIS06-1996 specified by Japanese Optical Glass Industrial Standards. The glass weight loss means the value, expressed as % by weight, of the glass weight reduced through the chemical durability test.

One gravity gram of glass sample, fractured into 425 to 600 micrometer grit, was weighed and put into a platinum cage. The platinum cage was inserted into a quartz-glass round-bottom flask containing pure water of pH 6.5 to 7.5, then was treated in a boiling-water bath for 60 minutes. The weight loss % of the treated glass samples was calculated and rated such that the weight loss (wt %) of less than 0.05 being class 1, the weight loss of from 0.05 to less than 0.10 being class 2, the weight loss of from 0.10 to less than 0.25 being class 3, the weight loss of from 0.25 to less than 0.60 being class 4, the weight loss of from 0.60 to less than 1.10 being class 5 and the weight loss of no less than 1.10 being class 6; the lower is the class number, more superior is the water resistance of the glass.

Table 1 (See attached)
Table 2 (See attached)
Table 3 (See attached)
Table 4 (See attached)
Table 5 (See attached)
Table 6 (See attached)
Table 7 (See attached)

The inventive glasses of Examples 1 to 54 exhibited lower glass transition temperatures compared to the glasses of Comparative Examples 1 and 2, displayed almost no crystal deposition, and were colorless and transparent, and also showed almost no change in the maximum transmissivity even after the reheating test. Furthermore, the glasses of Examples 52 to 54 represented the values of $Al_2O_3+ZrO_2+SiO_2+Bi_2O_3$ and $(Al_2O_3+ZrO_2+SiO_2)/RO$ higher than a certain level, and exhibited better results in terms of reheating tests (a) and (b) compared to the glass of Comparative Example 3.

An embodiment of the invention provides a desirable glass having lower production costs that exhibits a high index/high dispersion such as 1.75 or more of refractive index ($n_d$) and from 15 to 35 of Abbe number ($v_d$) as optical constants, and has a glass transition point (Tg) of no more than 550 degrees C., with at least one of the characteristics of being free from opacification and being devitrified within the glass body during the reheating step in the production processes of the aspheric lenses or during the reheating test corresponding to reheat presses, and also being free from black coloring.

An embodiment of the invention further provides an optical glass that exhibits transmissivity loss of no more than 5% at respective wavelengths of the visible region in a reheating test (b). The optical glass may hardly turn black in color even during reheating steps in the production process thereof. The reason the glass turns black in color is that the component of $Bi_2O_3$ turns into metal bismuth by action of non-oxidative gas when the glass material undergoes precision press-molding to produce an optical glass and the like. The term "respective wavelengths of visible region" as used herein means the wavelengths of 360 nm to 800 nm. The non-oxidative gas is preferably nitrogen gas, for example. The term "transmissivity loss" refers to the loss of transmissivity that is caused in the tested test piece compared to the pre-test test piece through the reheating test (b).

An embodiment of the invention further provides an optical glass that exhibits less transmissivity variation even at the reheating step in the production process thereof, since the value calculated from the transmissivities after and before the reheating test (a) is no less than 0.95, or the difference of $\lambda_{70}$ is no more than 20 nm between after and before the reheating test (a).

An embodiment of the invention further provides an optical glass with less foreign substances even during the reheating step in the production process thereof, by virtue of the internal quality of the first or second grade and A or B grade even after the reheating test (a) by the evaluation which is in accordance with the method of determining foreign substances JOGIS13-1994.

Concerning the description "internal quality of the first or second grade and A or B grade", the first grade indicates that the total cross section of foreign substances JOGIS13-1994 is less than 0.03 mm$^2$, and the second grade indicates that the total cross section is from no less than 0.03 mm$^2$ to no more than 0.1 mm$^2$ on the basis of 100 ml. The A grade indicates that the total number of the foreign substances is less than 10, and the B grade indicates from no less than 10 to less than 100 on the basis of 100 ml.

An embodiment of the invention further provides that the temperature of a mold pressing may be set at a lower temperature since the transition temperature (Tg) of the glass is no more than 550 degrees C. Accordingly, the reactivity between the glass and molds can be reduced, thus the transmissivity degradation may be easily suppressed, and at least one of the properties of opacification and vitrification of the glass may be easily prevented.

An embodiment of the invention further provides that $SiO_2+B_2O_3$ and a RO component+$Rn_2O$ component may stabilize the glass and also suppress transmissivity degradation in the reheating test (b). Accordingly, the optical glasses produced in these compositions may easily avoid transmissivity degradation through the reheating test.

An embodiment of the invention further provides that a total content of $Ln_2O_3+RO+Rn_2O$ within the range described above may lead to easy stabilization of the glass.

An embodiment of the invention further provides that a total content of $TiO_2+Nb_2O_5+WO_3+Ln_2O_3$ within the range described above may suppress the tendency to increase devitrification which is induced by the component MgO during the reheating test.

The alkaline metal components may be remarkably effective in stabilizing glasses and to lowering temperatures corresponding to thermal properties; therefore, the content of $Rn_2O$ within the range described above may bring about easy control of the glass water-resistance. Furthermore, the deterioration of moldability that is induced by possible alkaline elution at precision press-molding steps may be easily avoided.

An embodiment of the invention further provides that a total content of $Bi_2O_3+SiO_2+Al_2O_3+ZrO_2$ within the range described above may allow control of improvement of chemical durability, along with satisfying the refractive index of the glass. In addition, it may easily suppress coloring during mold-pressing. When a glass is to be produced with superior water resistance in particular, it is effective to raise the content of $Bi_2O_3$ and $SiO_2$; and when the acid resistance is to be improved, it is effective to decrease the content of $Bi_2O_3$ and to increase the content of $Al_2O_3$ and $ZrO_2$.

An embodiment of the invention further provides that the optical glass may be prevented from turning black in color when the glass undergoes precision press-molding to produce optical glasses and the like since the weight loss of the glass is no more than 0.2% by weight in terms of chemical durability test based on a powder method in accordance with JOGIS06-1996. Furthermore, the resulting glasses may be easily prevented from degradation at rinsing steps or during storage of the optical glasses, and also the transmissivity degradation may be easily prevented after forming lenses.

The term "chemical durability" refers to a decay in durability against glass corrosion induced by water, which may be determined by way of a "Method of Determining Chemical Durability of Optical Glass" JOGIS06-1996 as specified by Japanese Optical Glass Industrial Standards. The method rates samples into 6 steps of class 1 to class 6 from their weight loss on the basis of their weights before and after the test. The glass weight loss of 0.2% corresponds to a water resistance equal to or superior than class 3. In the method, class 1 represents less than 0.05% by weight of the weight loss on the basis of the weights before and after the test, class 2 represents from no less than 0.05% by weight to less than 0.10% by weight, class 3 represents from no less than 0.10% by weight to less than 0.25% by weight, class 4 represents from no less than 0.25% by weight to less than 0.60% by weight, class 5 represents from less than 0.60% by weight to less than 1.10% by weight, and class 6 represents no less than 1.10% by weight.

An embodiment of the invention further provides an optical element provided by way of precision press-molding since the optical glass hardly causes devitrification and also hardly colors into black even after reheating thereof.

An embodiment of the invention further provides an optical element formed by precision press-molding the preform for precision press-molding.

An embodiment of the invention further provides that the preform may be effectively utilized for precision press-molding since the preform is free from devitrification or coloring even after reheating thereof, thus the optical element may be easily produced by precision press-molding the preform for precision press-molding.

The optical glass according to embodiments of the invention may be provided as excellent optical glasses in terms of preform productivity, properties of preform itself, and press-molding property by virtue of employing the constitutional elements described above, furthermore, optical glasses may be easily provided with generally excellent properties including remarkably appropriate press-molding property.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

TABLE 1

|  | Examples | | | | | | | | |
| --- | --- | --- | --- | --- | --- | --- | --- | --- | --- |
|  | 1 | 2 | 3 | 4 | 5 | 6 | 7 | 8 | 9 |
| $SiO_2$ | 4.489 | 4.998 | 4.704 | 4.373 | 4.023 | 4.197 | 3.785 | 3.846 | 4.398 |
| $B_2O_3$ | 11.691 | 10.408 | 12.483 | 11.606 | 16.300 | 16.999 | 15.334 | 15.578 | 11.671 |
| $SiO_2 + B_2O_3$ | 16.180 | 15.406 | 17.187 | 15.979 | 20.323 | 21.196 | 19.119 | 19.424 | 16.069 |
| $SiO_2/B_2O_3$ | 0.384 | 0.480 | 0.377 | 0.377 | 0.247 | 0.247 | 0.247 | 0.247 | 0.377 |
| $Al_2O_3$ | | | | | | | | | |
| $Y_2O_3$ | | | | | | | | | |
| $La_2O_3$ | | | | | | | | | |
| $Gd_2O_3$ | | | | | | | | | |
| $Yb_2O_3$ | | | | | | | | | |
| $TiO_2$ | 2.587 | 2.343 | 2.658 | 0.989 | | | | | |
| $ZrO_2$ | | | | | | | | | |
| $Nb_2O_5$ | 1.688 | 3.464 | | 3.289 | | | | | |
| $Ta_2O_5$ | | | | | | | | | |
| $WO_3$ | 0.589 | | 1.543 | | | | | | 1.442 |
| ZnO | | | | | | | | | |
| MgO | | 0.788 | 1.609 | | | | | | |
| CaO | | | | | | | | | |
| SrO | | | | | | | | 3.316 | |
| BaO | 19.995 | 15.986 | 15.853 | 23.276 | 30.800 | 26.775 | 26.084 | 21.592 | 25.315 |
| RO | 19.995 | 16.774 | 17.462 | 23.276 | 30.800 | 26.775 | 26.084 | 24.908 | 25.315 |
| $Li_2O$ | 0.949 | 1.363 | 0.994 | 0.924 | 2.000 | 3.131 | 1.883 | 1.913 | 0.930 |
| $Na_2O$ | 2.952 | 3.231 | 3.299 | 2.684 | | | | | 3.085 |
| $K_2O$ | 2.691 | 3.683 | 1.880 | 1.748 | | | | | 1.758 |
| $Rn_2O$ | 6.592 | 8.277 | 6.173 | 5.356 | 2.000 | 3.131 | 1.883 | 1.913 | 5.773 |
| $RO + Rn_2O$ | 26.587 | 25.051 | 23.635 | 28.632 | 32.800 | 29.906 | 27.967 | 26.821 | 31.088 |
| $Sb_2O_3$ | | | 0.097 | 0.090 | 0.078 | 0.081 | 0.073 | 0.075 | 0.091 |
| $P_2O_5$ | | | | | | | | | |
| $Bi_2O_3$ | 52.368 | 53.737 | 54.880 | 51.021 | 46.800 | 48.817 | 52.841 | 53.681 | 51.310 |
| $GeO_2$ | | | | | | | | | |
| F | | | | | | | | | |
| TOTAL | 100.00 | 100.00 | 100.00 | 100.00 | 100.00 | 100.00 | 100.00 | 100.00 | 100.00 |
| $Al_2O_3 + ZrO_2 + SiO_2 + Bi_2O_3$ | 56.857 | 58.735 | 59.584 | 55.394 | 50.823 | 53.014 | 56.626 | 57.527 | 55.708 |

TABLE 1-continued

| | | Examples | | | | | | | | |
|---|---|---|---|---|---|---|---|---|---|---|
| | | 1 | 2 | 3 | 4 | 5 | 6 | 7 | 8 | 9 |
| $(Al_2O_3 + ZrO_2 + SiO_2)/RO$ | | 0.225 | 0.298 | 0.269 | 0.188 | 0.131 | 0.157 | 0.145 | 0.154 | 0.174 |
| $n_d$ | | 1.848 | 1.848 | 1.847 | 1.848 | 1.825 | 1.816 | 1.853 | 1.854 | 1.828 |
| $v_d$ | | 24.4 | 23.8 | 24.4 | 25.2 | 28.2 | 28.4 | 26.3 | 26.0 | 25.7 |
| Tg (° C.) | | 367 | 385 | 415 | 416 | 431 | 423 | 417 | 425 | 386 |
| Reheating test (a) | crystal deposit condition | 1A | 1A | 1A | 1A | 1A | 1A | 1A | 1A | 1A |
| | D ray transmissivity after test/D ray transmissivity before test (%) | 1 | 0.993 | 1 | 1.003 | 1 | 1 | 1 | 1 | 1 |
| | $\lambda_{70}$ after test-before test $\lambda_{70}$ (nm) | | 15.5 | | 16 | | | | | |
| Reheating test (b) | transmissivity loss (%) glass weight loss (wt %) | | | | | | | | | |

TABLE 2

| | Examples | | | | | | | | |
|---|---|---|---|---|---|---|---|---|---|
| | 10 | 11 | 12 | 13 | 14 | 15 | 16 | 17 | 18 |
| $SiO_2$ | 3.805 | 4.316 | | 4.246 | 4.501 | 4.650 | 4.568 | 4.378 | 4.593 |
| $B_2O_3$ | 15.429 | 11.049 | 16.651 | 11.265 | 11.944 | 12.340 | 12.572 | 11.618 | 11.735 |
| $SiO_2 + B_2O_3$ | 19.234 | 15.365 | 16.651 | 15.511 | 16.445 | 16.990 | 17.140 | 15.996 | 16.328 |
| $SiO_2/B_2O_3$ | 0.247 | 0.391 | | 0.377 | 0.377 | 0.377 | 0.363 | 0.377 | 0.391 |
| $Al_2O_3$ | | | | | | | | | |
| $Y_2O_3$ | | | | | | | | | |
| $La_2O_3$ | | | | | | | | | |
| $Gd_2O_3$ | | | | | | | | | |
| $Yb_2O_3$ | | | | | | | | | |
| $TiO_2$ | | | | | 2.543 | | 3.614 | 0.494 | 4.153 |
| $ZrO_2$ | | | | | | | | | |
| $Nb_2O_5$ | 3.366 | | | | | | | 3.292 | |
| $Ta_2O_5$ | | | | | | | | | |
| $WO_3$ | | | 1.432 | 1.393 | 1.476 | 1.525 | 1.498 | | 1.506 |
| ZnO | | | | | | | | | |
| MgO | | | | | | 4.242 | | | |
| CaO | | | | | | | | | |
| SrO | | | | | | | | | |
| BaO | 19.419 | 25.778 | 25.140 | 24.436 | 21.026 | 7.602 | 18.367 | 23.301 | 16.474 |
| RO | 19.419 | 25.778 | 25.140 | 24.436 | 21.026 | 11.844 | 18.367 | 23.301 | 16.474 |
| $Li_2O$ | 1.892 | 0.912 | 0.923 | | 0.951 | 0.983 | 0.965 | 0.925 | 0.971 |
| $Na_2O$ | | 3.027 | 3.063 | | 3.157 | 3.261 | 3.204 | 3.071 | 3.221 |
| $K_2O$ | 2.982 | 1.725 | 1.746 | 9.050 | 1.799 | 1.859 | 1.826 | 1.750 | 3.672 |
| $Rn_2O$ | 4.874 | 5.664 | 5.732 | 9.050 | 5.907 | 6.103 | 5.995 | 5.745 | 7.864 |
| $RO + Rn_2O$ | 24.293 | 31.441 | 30.872 | 33.486 | 26.933 | 17.947 | 24.362 | 29.046 | 24.338 |
| $Sb_2O_3$ | | | 0.090 | 0.087 | 0.093 | 0.096 | 0.094 | 0.090 | 0.095 |
| $P_2O_5$ | | | | | | | | | |
| $Bi_2O_3$ | 53.107 | 53.196 | 50.955 | 49.527 | 52.510 | 63.442 | 53.292 | 51.078 | 53.580 |
| $GeO_2$ | | | | | | | | | |
| F | | | | | | | | | |
| TOTAL | 100.00 | 100.00 | 100.00 | 100.00 | 100.00 | 100.00 | 100.00 | 100.00 | 100.00 |
| $Al_2O_3 + ZrO_2 + SiO_2 + Bi_2O_3$ | 56.912 | 57.512 | 50.955 | 53.773 | 57.011 | 68.092 | 57.860 | 55.456 | 58.173 |
| $(Al_2O_3 + ZrO_2 + SiO_2)/RO$ | 0.196 | 0.167 | 0.000 | 0.174 | 0.214 | 0.393 | 0.249 | 0.188 | 0.279 |
| $n_d$ | 1.837 | 1.839 | 1.814 | 1.820 | 1.841 | 1.834 | 1.858 | 1.842 | 1.844 |
| $v_d$ | 26.0 | 25.5 | 26.4 | 25.8 | 24.9 | 24.4 | 24.2 | 25.3 | 23.9 |
| Tg (° C.) | 423 | 385 | 393 | 424 | 408 | 408 | 421 | 417 | 397 |
| Reheating test (a) crystal deposit condition | 1A | 1A | 1A | 1A | 1A | 1A | 1A | 1A | 1A |
| D ray transmissivity after test/D ray transmissivity before test (%) | 1 | 1 | 1 | 1 | 1 | 1 | 1 | 1 | 1 |
| $\lambda_{70}$ after test-before test $\lambda_{70}$ (nm) | | | | | | | | | |

TABLE 2-continued

|  |  | Examples | | | | | | | | |
|---|---|---|---|---|---|---|---|---|---|---|
|  |  | 10 | 11 | 12 | 13 | 14 | 15 | 16 | 17 | 18 |
| Reheating test (b) | transmissivity loss (%) glass weight loss (wt %) | | | | | | | | | |

TABLE 3

|  |  | Examples | | | | | | | | |
|---|---|---|---|---|---|---|---|---|---|---|
|  |  | 19 | 20 | 21 | 22 | 23 | 24 | 25 | 26 | 27 |
| $SiO_2$ | | 4.445 | 4.187 | 4.254 | 4.629 | 4.627 | 4.602 | 4.202 | 3.857 | 3.925 |
| $B_2O_3$ | | 11.795 | 11.111 | 8.775 | 12.282 | 12.050 | 11.759 | 11.734 | 15.625 | 15.900 |
| $SiO_2 + B_2O_3$ | | 16.240 | 15.298 | 13.029 | 16.911 | 16.677 | 16.361 | 15.936 | 19.482 | 19.825 |
| $SiO_2/B_2O_3$ | | 0.377 | 0.377 | 0.485 | 0.377 | 0.384 | 0.391 | 0.358 | 0.247 | 0.247 |
| $Al_2O_3$ | | | | | | | | | | |
| $Y_2O_3$ | | | | | | | | | | |
| $La_2O_3$ | | | | | | | | | | |
| $Gd_2O_3$ | | | | | | | | | | |
| $Yb_2O_3$ | | | | | | | | | | |
| $TiO_2$ | | 2.009 | 0.946 | | 3.924 | 4.184 | 4.265 | 4.152 | | |
| $ZrO_2$ | | | | | | | | | | |
| $Nb_2O_5$ | | 1.671 | 3.149 | | | | | | | |
| $Ta_2O_5$ | | | | | | | | | | |
| $WO_3$ | | | | | | | 1.207 | 1.506 | | |
| ZnO | | | | | | | | | | |
| MgO | | | | | | | | | | 1.316 |
| CaO | | | | | | | | | | |
| SrO | | | | 8.105 | | | | | | |
| BaO | | 22.691 | 20.196 | 20.491 | 17.068 | 17.062 | 16.507 | 16.472 | 21.657 | 22.038 |
| RO | | 22.691 | 20.196 | 28.596 | 17.068 | 17.062 | 16.507 | 16.472 | 21.657 | 23.354 |
| $Li_2O$ | | 0.939 | 0.885 | 2.158 | 0.978 | 0.978 | 0.973 | 0.971 | 1.918 | 1.952 |
| $Na_2O$ | | 2.728 | 2.570 | | 3.246 | 3.245 | 3.228 | 3.623 | | |
| $K_2O$ | | 1.777 | 1.674 | | 3.700 | 3.699 | 3.679 | 3.671 | 3.024 | |
| $Rn_2O$ | | 5.444 | 5.129 | 2.158 | 7.924 | 7.922 | 7.880 | 8.265 | 4.942 | 1.952 |
| $RO + Rn_2O$ | | 28.135 | 25.325 | 30.754 | 24.992 | 24.984 | 24.387 | 24.737 | 26.599 | 25.306 |
| $Sb_2O_3$ | | 0.092 | 0.086 | 0.140 | 0.172 | 0.172 | 0.095 | 0.095 | 0.075 | 0.076 |
| $P_2O_5$ | | | | | | | | | | |
| $Bi_2O_3$ | | 51.853 | 55.196 | 56.077 | 54.001 | 53.983 | 53.686 | 53.574 | 53.844 | 54.793 |
| $GeO_2$ | | | | | | | | | | |
| F | | | | | | | | | | |
| TOTAL | | 100.00 | 100.00 | 100.00 | 100.00 | 100.00 | 100.00 | 100.00 | 100.00 | 100.00 |
| $Al_2O_3 + ZrO_2 + SiO_2 + Bi_2O_3$ | | 56.298 | 59.383 | 60.330 | 58.630 | 58.610 | 58.288 | 57.776 | 57.701 | 58.718 |
| $(Al_2O_3 + ZrO_2 + SiO_2)/RO$ | | 0.196 | 0.207 | 0.149 | 0.271 | 0.271 | 0.279 | 0.255 | 0.178 | 0.168 |
| $n_d$ | | 1.856 | 1.876 | 1.875 | 1.836 | 1.843 | 1.846 | 1.839 | 1.819 | 1.854 |
| $v_d$ | | 24.4 | 23.5 | 24.6 | 24.4 | 23.9 | 23.8 | 24.1 | 26.8 | 25.9 |
| Tg (° C.) | | 404 | 404 | 405 | 399 | 397 | 389 | 397 | 416 | 409 |
| Reheating test (a) | crystal deposit condition | 1A | 1A | 1A | 1A | 1A | 1A | 1A | 1A | 1A |
|  | D ray transmissivity after test/D ray transmissivity before test (%) | 1 | 1 | 1 | 1 | 1 | 1 | 1 | 1 | 0.994 |
|  | $\lambda_{70}$ after test-before test $\lambda_{70}$ (nm) | | | | | | | | | −7.5 |
| Reheating test (b) | transmissivity loss (%) glass weight loss (wt %) | | | | | | | | | |

TABLE 4

|  | Examples | | | | | | | | |
|---|---|---|---|---|---|---|---|---|---|
|  | 28 | 29 | 30 | 31 | 32 | 33 | 34 | 35 | 36 |
| $SiO_2$ | 3.984 | 4.960 | 4.565 | 4.600 | 4.675 | 4.417 | 4.637 | 4.626 | 4.698 |
| $B_2O_3$ | 16.140 | 13.185 | 12.114 | 12.207 | 10.565 | 11.722 | 11.848 | 11.818 | 10.615 |

TABLE 4-continued

| | Examples | | | | | | | | |
|---|---|---|---|---|---|---|---|---|---|
| | 28 | 29 | 30 | 31 | 32 | 33 | 34 | 35 | 36 |
| $SiO_2 + B_2O_3$ | 20.124 | 18.145 | 16.679 | 16.807 | 15.240 | 16.139 | 16.486 | 16.444 | 15.313 |
| $SiO_2/B_2O_3$ | 0.247 | 0.376 | 0.377 | 0.377 | 0.442 | 0.377 | 0.391 | 0.391 | 0.443 |
| $Al_2O_3$ | | | | | | | | | |
| $Y_2O_3$ | | | | | | | | | |
| $La_2O_3$ | | | | | | | | | |
| $Gd_2O_3$ | | | | | | | | | |
| $Yb_2O_3$ | | | | | | | | | |
| $TiO_2$ | | | 4.127 | 4.159 | 1.585 | | 4.717 | 4.444 | 2.389 |
| $ZrO_2$ | | | | | | | | | |
| $Nb_2O_5$ | | | | | 1.758 | 3.322 | | | 3.533 |
| $Ta_2O_5$ | | | | | | | | | |
| $WO_3$ | | 1.627 | 1.497 | 1.509 | 0.767 | | | | |
| ZnO | | | | | | | | | |
| MgO | | 4.524 | | | 2.132 | | | | 1.071 |
| CaO | | | | | | | | | |
| SrO | 6.871 | | | | | | | | |
| BaO | 12.202 | 11.335 | 18.355 | 16.500 | 15.249 | 23.508 | 16.602 | 17.056 | 13.247 |
| RO | 19.073 | 15.859 | 18.355 | 16.500 | 17.381 | 23.508 | 16.602 | 17.056 | 14.318 |
| $Li_2O$ | 1.982 | 1.048 | 0.965 | 0.972 | 0.988 | 0.934 | 0.980 | 0.978 | 1.787 |
| $Na_2O$ | | 3.478 | 3.202 | 3.226 | 3.279 | 2.710 | 3.253 | 3.244 | 3.295 |
| $K_2O$ | 3.123 | 1.982 | 1.825 | 3.065 | 4.361 | 1.766 | 3.707 | 3.698 | 4.382 |
| $Rn_2O$ | 5.105 | 6.508 | 5.992 | 7.263 | 8.628 | 5.410 | 7.940 | 7.920 | 9.464 |
| $RO + Rn_2O$ | 24.178 | 22.367 | 24.347 | 23.763 | 26.009 | 28.918 | 24.543 | 24.976 | 23.782 |
| $Sb_2O_3$ | 0.077 | | 0.094 | 0.095 | 0.096 | 0.091 | 0.153 | 0.172 | 0.174 |
| $P_2O_5$ | | | | | | | | | |
| $Bi_2O_3$ | 55.621 | 57.861 | 53.256 | 53.667 | 54.545 | 51.529 | 54.098 | 53.964 | 54.809 |
| $GeO_2$ | | | | | | | | | |
| F | | | | | | | | | |
| TOTAL | 100.00 | 100.00 | 100.00 | 100.00 | 100.00 | 100.00 | 100.00 | 100.00 | 100.00 |
| $Al_2O_3 + ZrO_2 + SiO_2 + Bi_2O_3$ | 59.605 | 62.821 | 57.821 | 58.267 | 59.220 | 55.946 | 58.735 | 58.590 | 59.507 |
| $(Al_2O_3 + ZrO_2 + SiO_2)/RO$ | 0.209 | 0.313 | 0.249 | 0.279 | 0.269 | 0.188 | 0.279 | 0.271 | 0.328 |
| $n_d$ | 1.816 | 1.824 | 1.867 | 1.848 | 1.828 | 1.848 | 1.856 | 1.856 | 1.839 |
| $v_d$ | 27.0 | 24.8 | 23.8 | 24 | 24.3 | 24.9 | 23.2 | 23.2 | 23.9 |
| Tg (° C.) | 419 | 393 | 421 | 409 | 385 | 395 | 397 | 395 | 381 |
| Reheating test (a) | crystal deposit condition | 1A | 1A | 1A | 1A | 1A | 1A | 1A | 1A | 1A |
| | D ray transmissivity after test/D ray transmissivity before test (%) | 1 | 1 | 0.981 | 1 | 1 | 1 | 1 | 1 | 1.007 |
| | $\lambda_{70}$ after test-before test $\lambda_{70}$ (nm) | | | 6 | | | | | | 15 |
| Reheating test (b) | transmissivity loss (%) | | | | | | | | | |
| | glass weight loss (wt %) | | | | | | | | | |

TABLE 5

| | Examples | | | | | | | | |
|---|---|---|---|---|---|---|---|---|---|
| | 37 | 38 | 39 | 40 | 41 | 42 | 43 | 44 | 45 |
| $SiO_2$ | 4.477 | 4.463 | 4.504 | 4.503 | 4.603 | 4.615 | 4.518 | 4.445 | 4.433 |
| $B_2O_3$ | 11.905 | 8.328 | 10.179 | 10.176 | 11.762 | 11.790 | 11.567 | 8.294 | 10.016 |
| $SiO_2 + B_2O_3$ | 16.382 | 12.791 | 14.683 | 14.679 | 16.365 | 16.405 | 16.085 | 12.739 | 14.449 |
| $SiO_2/B_2O_3$ | 0.376 | 0.536 | 0.442 | 0.443 | 0.391 | 0.391 | 0.391 | 0.536 | 0.443 |
| $Al_2O_3$ | | | | | | | | | |
| $Y_2O_3$ | | | | | | | | | |
| $La_2O_3$ | | | | | | | | | |
| $Gd_2O_3$ | | | | | | | | | |
| $Yb_2O_3$ | | | | | | | | | |
| $TiO_2$ | | 2.522 | 3.309 | 3.308 | 3.902 | 4.172 | 5.107 | 2.512 | 3.256 |
| $ZrO_2$ | | | | | | | | | |
| $Nb_2O_5$ | | | | | | | | | |
| $Ta_2O_5$ | | | | | | | | | |
| $WO_3$ | 1.468 | 1.464 | 1.477 | 1.477 | | | | 1.458 | 1.454 |
| ZnO | | | | | | | | | |

TABLE 5-continued

|  |  | Examples | | | | | | | | |
|---|---|---|---|---|---|---|---|---|---|---|
|  |  | 37 | 38 | 39 | 40 | 41 | 42 | 43 | 44 | 45 |
| MgO | | 4.085 | | | | | | | | |
| CaO | | | | | | | | | | |
| SrO | | | | | | | | | | |
| BaO | | 25.727 | 20.850 | 19.576 | 18.778 | 17.973 | 17.516 | 17.187 | 20.766 | 18.466 |
| RO | | 29.811 | 20.850 | 19.576 | 18.778 | 17.973 | 17.516 | 17.187 | 20.766 | 18.466 |
| $Li_2O$ | | | 0.943 | 0.952 | 0.952 | 0.973 | 0.975 | 0.955 | 0.939 | 0.937 |
| $Na_2O$ | | | 3.913 | 3.159 | 3.158 | 3.229 | 3.237 | 3.169 | 3.118 | 3.109 |
| $K_2O$ | | | 5.352 | 4.201 | 4.600 | 3.680 | 3.689 | 1.806 | 6.515 | 4.134 |
| $Rn_2O$ | | | 10.208 | 8.312 | 8.710 | 7.882 | 7.901 | 5.930 | 10.572 | 8.180 |
| $RO + Rn_2O$ | | 29.811 | 31.058 | 27.888 | 27.488 | 25.855 | 25.417 | 23.117 | 31.338 | 26.646 |
| $Sb_2O_3$ | | 0.092 | 0.092 | 0.093 | 0.117 | 0.171 | 0.171 | | 0.092 | 0.146 |
| $P_2O_5$ | | | | | | | | | | |
| $Bi_2O_3$ | | 52.242 | 52.072 | 52.550 | 52.931 | 53.706 | 53.835 | 55.691 | 51.861 | 54.049 |
| $GeO_2$ | | | | | | | | | | |
| F | | | | | | | | | | |
| TOTAL | | 100.00 | 100.00 | 100.00 | 100.00 | 100.00 | 100.00 | 100.00 | 100.00 | 100.00 |
| $Al_2O_3 + ZrO_2 + SiO_2 + Bi_2O_3$ | | 56.719 | 56.535 | 57.054 | 57.434 | 58.309 | 58.450 | 60.209 | 56.306 | 58.482 |
| $(Al_2O_3 + ZrO_2 + SiO_2)/RO$ | | 0.150 | 0.214 | 0.230 | 0.240 | 0.256 | 0.263 | 0.263 | 0.214 | 0.240 |
| $n_d$ | | 1.867 | 1.829 | 1.829 | 1.835 | 1.840 | 1.845 | 1.880 | 1.842 | 1.853 |
| $v_d$ | | 25.4 | 24.3 | 24.2 | 24.2 | 24.2 | 23.8 | 22.8 | 23.9 | 23.2 |
| Tg (° C.) | | 416 | 379 | 394 | 405 | 405 | 389 | 426 | 374 | 372 |
| Reheating test (a) | crystal deposit condition | 1A | 1A | 1A | 1A | 1A | 1A | 1A | 1A | 1A |
| | D ray transmissivity after test/D ray transmissivity before test (%) | 1 | 1 | 1 | 1 | 1 | 1 | 1 | 0.977 | 1.007 |
| | $\lambda_{70}$ after test before test $\lambda_{70}$ (nm) | | | | | | | | −1.5 | 8 |
| Reheating test (b) | transmissivity loss (%) | | | | | | | | | |
| | glass weight loss (wt %) | | | | | | | | | |

TABLE 6

|  | Examples | | | | | |
|---|---|---|---|---|---|---|
|  | 46 | 47 | 48 | 49 | 50 | 51 |
| $SiO_2$ | 4.467 | 2.954 | 4.315 | 4.353 | 4.476 | 2.849 |
| $B_2O_3$ | 10.093 | 8.900 | 8.666 | 8.743 | 8.989 | 9.904 |
| $SiO_2 + B_2O_3$ | 14.560 | 11.854 | 12.981 | 13.096 | 13.465 | 12.753 |
| $SiO_2/B_2O_3$ | 0.443 | 0.332 | 0.498 | 0.498 | 0.498 | 0.288 |
| $Al_2O_3$ | | | | | | |
| $Y_2O_3$ | | | | | | |
| $La_2O_3$ | | 6.408 | 3.119 | | | |
| $Gd_2O_3$ | | | | 3.502 | | |
| $Yb_2O_3$ | | | | | | |
| $TiO_2$ | 3.282 | | | | 0.794 | |
| $ZrO_2$ | | | 0.590 | | | |
| $Nb_2O_5$ | | | | | | |
| $Ta_2O_5$ | | | | | | |
| $WO_3$ | 1.465 | | | | | |
| ZnO | | 4.001 | 3.117 | 3.931 | 4.041 | 1.930 |
| MgO | | | | | | |
| CaO | | | | | | |
| SrO | | | | 1.502 | 1.544 | 1.474 |
| BaO | 18.991 | 7.539 | 2.936 | | | 5.090 |
| RO | 18.991 | 11.540 | 6.053 | 5.433 | 5.585 | 8.494 |
| $Li_2O$ | 0.944 | 1.469 | 1.431 | 1.443 | 1.484 | 1.417 |
| $Na_2O$ | 3.133 | | | | | |
| $K_2O$ | 4.166 | | | | | |

TABLE 6-continued

| | | Examples | | | | | |
|---|---|---|---|---|---|---|---|
| | | 46 | 47 | 48 | 49 | 50 | 51 |
| $Rn_2O$ | | 8.243 | 1.469 | 1.431 | 1.443 | 1.484 | 1.417 |
| $RO + Rn_2O$ | | 27.234 | 13.009 | 7.484 | 6.876 | 7.069 | 9.911 |
| $Sb_2O_3$ | | 0.166 | | | | | |
| $P_2O_5$ | | | | | | | |
| $Bi_2O_3$ | | 53.293 | 68.729 | 75.821 | 76.526 | 78.673 | 77.336 |
| $GeO_2$ | | | | | | | |
| F | | | | | | | |
| TOTAL | | 100.00 | 100.00 | 100.00 | 100.00 | 100.00 | 100.00 |
| $Al_2O_3 + ZrO_2 + SiO_2 + Bi_2O_3$ | | 57.76 | 71.683 | 80.726 | 80.879 | 83.149 | 80.185 |
| $(Al_2O_3 + ZrO_2 + SiO_2)/RO$ | | 0.235 | 0.256 | 0.810 | 0.801 | 0.801 | 0.335 |
| $n_d$ | | 1.848 | 1.969 | 2.031 | 2.034 | 2.043 | 2.007 |
| $v_d$ | | 23.5 | 21.6 | 19.4 | 19.2 | 18.7 | 19.6 |
| Tg (° C.) | | 395 | 415 | 388 | 385 | 383 | 380 |
| Reheating test (a) | crystal deposit condition | 1A | 1A | 1A | 1A | 1A | 1A |
| | D ray transmissivity after test/D ray transmissivity before test (%) | 1 | 1 | 1 | 1 | 1 | 1 |
| | $\lambda_{70}$ after test- before test $\lambda_{70}$ (nm) | | | | | | |
| Reheating test (b) | transmissivity loss (%) | | | | | | |
| | glass weight loss (wt %) | | | | | | |

TABLE 7

| | Examples | | | | | | Comparative Examples | | |
|---|---|---|---|---|---|---|---|---|---|
| | 52 | 53 | 54 | 55 | 56 | 57 | 1 | 2 | 3 |
| $SiO_2$ | 5.856 | 5.861 | 5.861 | 4.82 | 4.860 | 5.032 | | 4.883 | 4.37 |
| $B_2O_3$ | 13.226 | 12.236 | 13.236 | 12.78 | 12.922 | 15.335 | 26.000 | 12.981 | 11.61 |
| $SiO_2 + B_2O_3$ | 19.082 | 18.097 | 19.097 | 17.60 | 17.782 | 20.367 | 26.000 | 17.864 | 15.979 |
| $SiO_2/B_2O_3$ | 0.443 | 0.479 | 0.443 | 0.377 | 0.376 | 0.328 | 0.000 | 0.376 | 0.376 |
| $Al_2O_3$ | 5.538 | 5.542 | 6.542 | | | | 10.000 | | |
| $Y_2O_3$ | | | | | | | | | |
| $La_2O_3$ | | | | | | | 10.000 | | |
| $Gd_2O_3$ | | | | | | | | | |
| $Yb_2O_3$ | | | | | | | | | |
| $TiO_2$ | | | | 1.09 | | | | | 0.99 |
| $ZrO_2$ | 0.999 | 2.000 | | | | | | | |
| $Nb_2O_5$ | | | | 3.62 | | | | 3.672 | 3.29 |
| $Ta_2O_5$ | | | | | | | | | |
| $WO_3$ | | | | | 1.594 | | | 1.601 | |
| ZnO | | | | | | 6.098 | 4.000 | | |
| MgO | | | | | 4.434 | | | 4.454 | |
| CaO | 11.27 | 11.279 | | | | 4.203 | | | |
| SrO | | | | 10.97 | | | | | |
| BaO | | | 8.994 | 9.40 | 17.434 | 6.035 | | 9.041 | 23.28 |
| RO | 11.27 | 11.279 | 8.994 | 20.374 | 21.868 | 16.336 | 4.000 | 13.495 | 23.276 |
| $Li_2O$ | | | | 1.02 | 2.054 | 1.063 | | 1.032 | 0.92 |
| $Na_2O$ | | | | | | 3.529 | | 3.424 | 2.68 |
| $K_2O$ | | | | | | | | 1.952 | 1.748 |
| $Rn_2O$ | 0 | 0 | 0 | 1.02 | 2.05 | 4.59 | | 6.408 | 5.356 |
| $RO + Rn_2O$ | 11.27 | 11.279 | 0 | 21.394 | 23.918 | 20.926 | 4.000 | 19.903 | 32.632 |
| $Sb_2O_3$ | 0.16 | 0.082 | 0.082 | 0.1 | | | | | 0.09 |
| $P_2O_5$ | | | | | | | | | |
| $Bi_2O_3$ | 62.95 | 63.000 | 65.285 | 56.2 | 56.702 | 58.705 | 50.000 | 56.960 | 51.02 |
| $GeO_2$ | | | | | | | | | |
| F | | | | | | | | | |
| TOTAL | 100.00 | 100.00 | 100.00 | 100.00 | 100.00 | 100.00 | 100.00 | 100.00 | 100.00 |
| $Al_2O_3 + ZrO_2 + SiO_2 + Bi_2O_3$ | 75.344 | 76.403 | 77.688 | 61.020 | 61.562 | 63.737 | 60.000 | 61.843 | 55.390 |
| $(Al_2O_3 + ZrO_2 + SiO_2)/RO$ | 1.100 | 1.188 | 1.379 | 0.237 | 0.222 | 0.308 | 2.500 | 0.362 | 0.188 |
| $n_d$ | 1.855 | 1.86 | 1.856 | 1.913 | 1.866 | 1.836 | 1.748 | 1.847 | 1.857 |

TABLE 7-continued

| | | Examples | | | | | | Comparative Examples | | |
|---|---|---|---|---|---|---|---|---|---|---|
| | | 52 | 53 | 54 | 55 | 56 | 57 | 1 | 2 | 3 |
| $v_d$ | | 25.6 | 25.4 | 24.5 | 23.4 | 25 | 25.6 | 32.8 | 23.7 | 24.5 |
| Tg (° C.) | | 492 | 503 | 458 | 453 | | | 519 | 439 | 415 |
| Reheating test (a) | crystal deposit condition | 1A | 1A | 1A | 1A | 1A | 1A | no data due to higher Tg | non-detectable due to opacifi | 1A |
| | D ray transmissivity after test/D ray transmissivity before test (%) | 1 | 1 | 1 | 0.995 | 1.008 | 1.002 | no data due to higher Tg | 0 | 1 |
| | $\lambda_{70}$ after test-before test $\lambda_{70}$ (nm) | | | | −13.5 | 16 | 15.5 | | | |
| Reheating test (b) | transmissivity loss (%) | 1 | 0.7 | 0.9 | | | | | | 22.27 |
| | glass weight loss (wt %) | 0.03 | 0.02 | 0.02 | | | | | | 0.36 |

We claim:

1. An optical glass, comprising:
a refractive index ($n_d$) of no less than 1.75 and an Abbe number ($v_d$) of no less than 10 as optical constants,
wherein a $Bi_2O_3$ content is no less than 51.310% by weight to no more than 80.643% by weight, a content of $B_2O_3$ is from no less than 7.530% by weight to no more than 30% by weight, a content of $SiO_2$ is no more than 5.861% by weight, a total content of $Ln_2O_3+RO+Rn_2O$ is from no less than 0.5% by weight to no more than 50% by weight, a content of ZnO is no more than 10% by weight, in which R represents one or more elements selected from the group consisting of Zn, Ba, Sr, Ca, and Mg, in which Rn represents one or more elements selected from the group consisting of Li, Na, K and Cs, and in which Ln represents one or more elements selected from the group consisting of La, Gd, Y, Ce, Eu, Dy, Yb and Lu,
wherein the optical glass has at least one of the properties of being substantially free from opacification and/or being substantially devitrified within the glass body under the conditions of the following reheating test (a), and
wherein, a test piece of 15 mm by 15 mm by 30 mm is reheated, such that the test piece is heated from room temperature to a temperature of 80 degrees C. higher than its transition temperature (Tg) for a period of 150 minutes, maintained for 30 minutes at the temperature of 80 degrees C. higher than the glass transition temperature (Tg) of the optical glass, allowed to cool to an ambient temperature, and finally observed visually after polishing the opposing two sides of the test piece to a thickness of 10 mm.

2. The optical glass according to claim 1, wherein the transmissivity loss is no more than 5% at respective wavelengths in the visible region under the conditions of the following reheating test (b),
wherein a two sided-polished test piece having a thickness of 10 mm is heated from room temperature to a yield point by increasing the temperature at a rate of 6.5 degrees C. per second under a non-oxidizing atmosphere, being maintained at the yield point for 300 seconds, lowering the temperature to 220 degrees C. by decreasing the temperature at a rate of 2.4 degrees C. per second, and thereafter measuring the transmissivity of the test piece to determine the transmissivity before and after the test.

3. The optical glass according to claim 1, wherein a value, calculated by dividing the transmissivity of the test piece after the reheating test (a) by the transmissivity of the test piece before the reheating test, using a radiation (D ray) at a wavelength of 587.56 nm, is no less than 0.95.

4. The optical glass according to claim 1, wherein the difference in a wavelength $\lambda_{70}$ of the test piece before the reheating test (a) and a wavelength $\lambda_{70}$ after the reheating test is no more than 20 nm, in which the "$\lambda_{70}$" refers to the wavelength at which the transmissivity is 70%.

5. The optical glass according to claim 1, wherein the crystal deposit condition of the test piece after the reheating test (a) displays an internal quality of a first or second grade and A or B grade by an evaluation which is in accordance with a measuring method for inclusion JOGIS 13-1994.

6. The optical glass according to claim 1, wherein the transition temperature (Tg) of the glass is no more than 550 degrees C.

7. The optical glass according to claim 1, wherein the total content of $TiO_2+Nb_2O_5+WO_3+RO+Rn_2O$ is no more than 60% by weight, in which R represents one or more elements selected from the group consisting of Zn, Ba, Sr, Ca and Mg; and Rn represents one or more elements selected from the group consisting of Li, Na, K and Cs.

8. The optical glass according to claim 1, wherein the total content of $TiO_2+Nb_2O_5+WO_3+RO+Rn_2O$ is from no less than 0.1% by weight to no more than 55% by weight, in which R represents one or more elements selected from the group consisting of Zn, Ba, Sr, Ca and Mg; and Rn represents one or more elements selected from the group consisting of Li, Na, K and Cs.

9. The optical glass according to claim 1, wherein the total content of $RO+Rn_2O$ is no less than 0.1% by weight, in which R represents one or more elements selected from the group consisting of Zn, Ba, Sr, Ca and Mg; and Rn represents one or more elements selected from the group consisting of Li, Na, K and Cs.

10. The optical glass according to claim 1, wherein the content of MgO is less than 4% by weight, and the content of $TiO_2+Nb_2O_5+WO_3+Ln_2O_3$ is no more than 10% by weight, in which Ln represents one or more elements selected from the group consisting of La, Gd, Y, Ce, Eu, Dy, Yb and Lu.

11. The optical glass according to claim 1, wherein the content of $Rn_2O$ is from 0% by weight to 1.5% by weight, in which Rn represents one or more elements selected from the group consisting of Li, Na, K and Cs.

12. The optical glass according to claim 1, wherein the total content of $Bi_2O_3+SiO_2+Al_2O_3+ZrO_2$ is no less than 75% by weight.

13. The optical glass according to claim 1, wherein the weight loss of the glass is no more than 0.2% by weight in terms of a chemical durability test based on a powder method in accordance with JOGIS-1996.

14. The optical glass according to claim 1, wherein a value of $(SiO_2+Al_2O_3\ Al_2O_3+ZrO_2)/RO$ is no less than 0.5.

15. An optical element formed by precision press-molding of the optical glass according to claim 1.

16. A preform utilized for precision press-molding comprising of the optical glass according to claim 1.

17. An optical element formed by precision press-molding of the preform utilized for precision press-molding according to claim 16.

18. A method for employing the optical glass according to claim 1, wherein the method comprises exposing the optical glass to radiation having a visible wavelength.

* * * * *